April 17, 1962 R. D. VAN LUNEN ET AL 3,030,156

SUPPORTING DEVICE

Filed June 15, 1960

*INVENTORS.*
Richard D. Van Lunen
Earl A. Noel
*BY* Arthur H. Swenson
ATTORNEY.

United States Patent Office 3,030,156
Patented Apr. 17, 1962

3,030,156

SUPPORTING DEVICE

Richard D. Van Lunen, Lanham, and Earl A. Noel, Silver Spring, Md., assignors to Minneapolis-Honeywell Regulator Company, Minneapolis, Minn., a corporation of Delaware Filed June 15, 1960, Ser. No. 36,273
5 Claims. (Cl. 308—18)

This invention relates to tape supporting devices. More specifically, the present invention relates to a tape idler.

An object of the present invention is to provide an improved tape idler for uniformly supporting a tape thereupon.

Another object of the present invention is to provide an improved tape idler having means for reducing the probability of inadvertent contact by attending personnel with rotating portions of the tape idler.

A further object of the present invention is to provide an improved tape idler for minimizing the probability of damaging the tape during an initial positioning of the tape on the idler and a subsequent movement thereacross.

A still further object of the present invention is to provide an improved tape idler, as set forth, which is characterized by simplicity of operation and construction.

In accomplishing these and other objects, there has been provided, in accordance with the present invention, a tape idler having a rotatable tape-bearing surface. The tape-bearing surface is a crowned cylinder supported at both ends by bearings. The aforesaid bearings are mounted upon a common shaft passing therethrough and having a threaded extension at both ends. One of these threaded ends is used to support a stationary end-cap member adjacent to the aforesaid tape-bearing surface but spaced therefrom. The other threaded end of the common shaft is used for mounting the idler structure in a desired position in a tape transport apparatus.

A better understanding of the present invention may be had from the following detailed description when read in connection with the accompanying drawings, in which.

Figure 1:
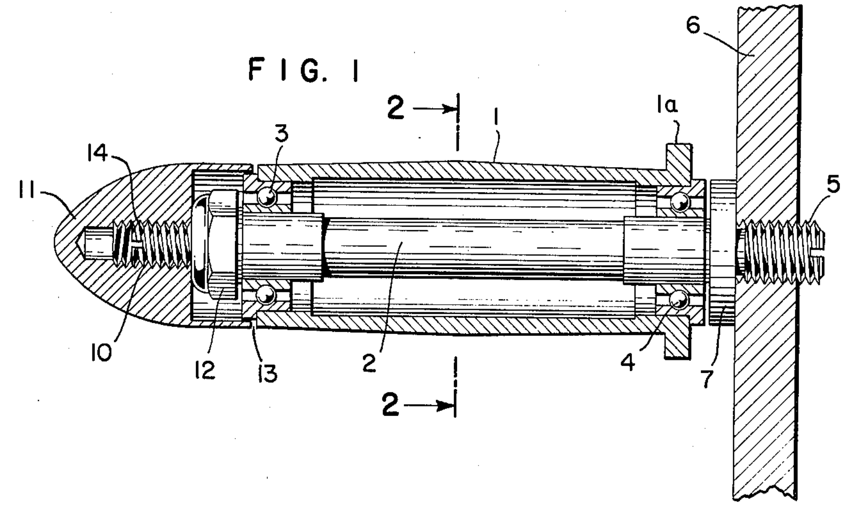
FIG. 1 is a cross-sectional representation of a tape idler embodying the present invention.
Figure 2:
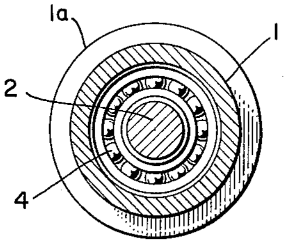
FIG. 2 is an end view of the tape idler shown in FIG. 1 along the line 2—2.
Figure 3:
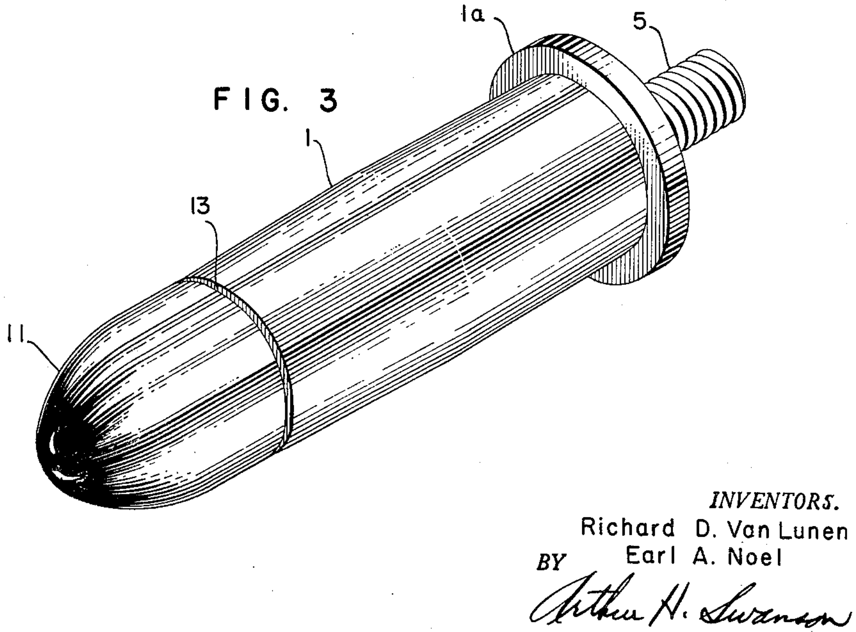
FIG. 3 is a pictorial representation of the tape idler shown in FIG. 1.

Referring to the drawings in more detail, there is shown a tape idler having a crowned cylinder 1, having a flange 1*a* at an inner end thereof, for supporting a tape thereupon. The cylinder 1 is rotatably supported at both ends upon a shaft 2 by bearing means 3 and 4; e.g., ball bearings, which shaft 2 has ends extending past the bearing means 3, 4.

A first end 5 of the shaft 2 is threaded to enable the tape idler to be mounted on tape apparatus 6. A collar 7 is attached to or integral with the shaft 2 between the bearing means 4 and the threaded first end 5 to provide a longitudinally positioning means for the shaft 2 in the tape apparatus 6.

A second end 10 of the shaft 2 is also threaded and carries a stationary end-cap 11 mounted thereupon. A nut 12 is also mounted on the threaded second end 10 to space the end-cap 11 from the cylinder 1 by a predetermined gap 13. Further, the end-cap 11 and cylinder 1 are arranged to have a similar radius at the gap 13 to provide a smooth transition for a tape thereacross. The second threaded end 10 of the shaft 2 is provided with an axial screwdriver slot 14 to enable the tape idler to be attached to the tape apparatus 6 by means of the first threaded end 5.

In operation, the tape idler is mounted on the tape apparatus 6, and the tape is positioned against the tape idler. A movement of the tape across the crowned cylinder 1 is effective to rotate the cylinder 1 on the bearing means 3 and 4. Assume the tape was incorrectly positioned on the tape idler; e.g., part of the tape was resting on the end-cap 11. A rotation of the crowned cylinder 1 is effective to position the tape thereupon with equal portions of the tape disposed on both sides of the crown apex. Thus, the rotation of the cylinder 1 by the moving tape is effective to slide the tape across the gap 13 to a centered position on the cylinder 1. As previously mentioned, the end-cap 11 and the cylinder 1 are arranged to have a similar radius at the gap 13 to enable the tape to pass smoothly thereacross. Consequently, the tape idler is effective to protect the tape during an initial positioning of the tape and subsequent movement thereof across the idler. The flange 1*a* is used to prevent the tape from being damaged against the tape apparatus 6 as by a careless positioning. The further movement of the tape across the tape idler is, consequently, confined to the rotating cylinder 1, and the stationary end-cap 11 is effective by protruding from the end of the tape idler to prevent an accidental contact with the rotating cylinder 1 by an attending operator.

Subject matter disclosed but not claimed in this application is shown and claimed in the copending applications of Richard D. Van Lunen and Earl A. Noel, Serial No. D–60,973 which was filed on June 15, 1960 and Serial No. D–60,974 which was filed on June 15, 1960.

Thus, it may be seen that there has been provided in accordance with the present invention, a tape idler for supporting a tape thereupon and which has means for reducing the probability of inadvertent contact by attending personnel with the rotating portion of the tape idler and the possibility of damaging the tape during an initial positioning of the tape on the tape idler and a subsequent movement of the tape thereacross.

What is claimed is:

1. An idler comprising a crowned cylinder, bearing mean for said cylinder, a shaft passing through said cylinder, said bearing means rotatably supporting said cylinder on said shaft, said shaft having a first end and a second end extending beyond said bearing means, respectively, said first end being arranged to mount said idler in an operative position on associated equipment, and an end cap having a radius at one end thereof similar to the radius of an end of said cylinder, said end-cap being supported on said second end in a spaced relationship with said cylinder to form a substantially smooth extension of said cylinder.

2. An idler comprising a crowned cylinder, bearing means for said cylinder, a shaft passing through said cylinder, said bearing means rotatably supporting said cylinder on said shaft, said shaft having a first end and a second end extending past said bearing means corresponding thereto, said first end being arranged to mount said idler in an operative position on associated equipment, and an end-cap having a radius at one end thereof similar to the radius of an end of said cylinder, said end-cap being stationarily supported on said second end in a predetermined spaced relationship with said cylinder to form a substantially smooth extension of said cylinder.

3. An idler comprising a crowned cylinder, bearing means for said cylinder, a shaft passing through said cylinder, said bearing means rotatably supporting said cylinder on said shaft, said shaft having a first end and a second end of said shaft extending past said bearing means corresponding thereto, said first end being arranged to mount said idler in an operative position on associated equipment, an end-cap having a radius at one end thereof similar to the radius of an end of said cylinder, said end-cap being supported on said second end to form a substantially smooth extension of said cylinder and spacing means on said second end to space said end-cap from said cylinder.

4. An idler comprising a crowned cylinder having a flange at one end thereof, bearing means for said cylinder, a shaft passing through said cylinder, said bearing means rotatably supporting said cylinder on said shaft, said shaft having a first end and a second end of said shaft extending past said bearing means corresponding thereto, said first end being adjacent to said flange and arranged to mount said idler in an operative position on associated equipment, an end-cap having a radius at one end thereof similar to the radius of the unflanged end of said cylinder, said end-cap being supported on said second end to form a substantially smooth extension of said cylinder and spacing means on said second end to space said end-cap from said cylinder.

5. A tape idler for supporting a tape in a tape apparatus comprising a crowned cylinder having a flange at one end thereof, bearing means for said cylinder, a shaft passing through said cylinder, said bearing means rotatably supporting said cylinder on said shaft, said shaft having a first end and a second end of said shaft extending past said bearing means corresponding thereto, said first end being adjacent to said flange and arranged to mount said idler in an operative position in said tape apparatus, an end-cap having a radius at one end thereof similar to the radius of the unflanged end of said cylinder, said end-cap being stationarily supported on said second end to form a substantially smooth extension of said cylinder and spacing means on said second end to space said end-cap from said cylinder.

References Cited in the file of this patent

UNITED STATES PATENTS 2,728,240 Stahlecker ______________ Dec. 27, 1955

FOREIGN PATENTS 258,411 Great Britain _________ Sept. 23, 1936